(12) United States Patent
Zhu et al.

(10) Patent No.: US 9,914,586 B2
(45) Date of Patent: Mar. 13, 2018

(54) PARCEL SORTING SYSTEM AND METHOD

(71) Applicant: Hangzhou Yamei Li-Jia Science And Technology Co. Ltd., Hangzhou, Zhejiang (CN)

(72) Inventors: Jianqiang Zhu, Hangzhou (CN); Juejing Xu, Hangzhou (CN)

(73) Assignee: Hangzhou Yamei Li-Jia Science And Technology Co. Ltd., Hangzhou (CN)

( * ) Notice: Subject to any disclaimer, the term of this patent is extended or adjusted under 35 U.S.C. 154(b) by 0 days.

(21) Appl. No.: 15/455,099

(22) Filed: Mar. 9, 2017

(65) Prior Publication Data

US 2017/0174432 A1    Jun. 22, 2017

Related U.S. Application Data

(63) Continuation of application No. PCT/CN2016/090684, filed on Jul. 20, 2016.

(30) Foreign Application Priority Data

Jul. 22, 2015    (CN) .......................... 2015 1 0433995

(51) Int. Cl.
*B65G 1/06* (2006.01)
*B65G 1/04* (2006.01)
(Continued)

(52) U.S. Cl.
CPC .............. *B65G 1/0492* (2013.01); *B07C 3/14* (2013.01); *B65G 1/06* (2013.01); *B65G 1/137* (2013.01);
(Continued)

(58) Field of Classification Search
CPC .................................. B65G 1/0492; B65G 1/06
See application file for complete search history.

(56) References Cited

U.S. PATENT DOCUMENTS 4,861,018 A * 8/1989 Kerstein ................. B65H 5/025
271/274
5,875,434 A * 2/1999 Matsuoka ............ B65G 1/1376
235/385
(Continued)

FOREIGN PATENT DOCUMENTS

CA    2898374 A1    1/2016
CN    103331266 A   10/2013
(Continued)

OTHER PUBLICATIONS

State Intellectual Property Office of the P.R.. China, International Search Report and Written Opinion for PCT/CN2016/090684 dated Oct. 31, 2016.

*Primary Examiner* — Thomas Randazzo
(74) *Attorney, Agent, or Firm* — NK Patent Law, PLLC

(57) ABSTRACT

Provided are a parcel sorting system and method, solving the problem that parcel sorting efficiency needs to be improved in the prior art. The parcel sorting system comprises a parcel sorting device and a parcel collecting device. The parcel sorting device is provided thereon with a plurality of parcel inspection inlets and a plurality of parcel outlets. The parcel collecting device is located under the parcel sorting device. The parcel outlets on the parcel sorting device communicate with the parcel collecting device. The parcel outlets are respectively located at the middle or/and edges of the parcel sorting device. The parcel collecting device is provided thereon with storage devices at positions under respective parcel outlets; and diameter of the storing device is larger than that of the parcel outlet. When the method is used, the parcel sorting efficiency is obviously improved; the implementation is convenient; and popularization and application are facilitated.

18 Claims, 3 Drawing Sheets

(51) Int. Cl.
   *B65G 1/137* (2006.01)
   *G06Q 10/08* (2012.01)
   *B07C 3/14* (2006.01)

(52) U.S. Cl.
   CPC ..... *G06Q 10/08* (2013.01); *B65G 2203/0216* (2013.01)

(56) References Cited

U.S. PATENT DOCUMENTS

| | | | |
|---|---|---|---|
| 6,600,418 B2 | 7/2003 | Francis et al. | |
| 6,775,588 B1 * | 8/2004 | Peck | B65G 1/137 700/214 |
| 7,038,573 B2 | 5/2006 | Bann | |
| 7,119,689 B2 * | 10/2006 | Mallett | B07C 5/3412 209/583 |
| 7,221,276 B2 | 5/2007 | Olsen, III et al. | |
| 7,597,187 B2 | 10/2009 | Bausenwein et al. | |
| 8,442,266 B2 * | 5/2013 | Berger | B07C 3/14 235/375 |
| 8,515,575 B2 * | 8/2013 | Pfeiffer | G06Q 10/08 414/273 |
| 8,731,708 B2 * | 5/2014 | Shakes | G06Q 10/08 700/216 |
| 9,152,149 B1 | 10/2015 | Palamarchuk et al. | |
| 9,187,268 B2 | 11/2015 | Denninger et al. | |
| 9,499,346 B2 * | 11/2016 | Triesenberg, III | B65G 23/14 |
| 9,611,107 B2 | 4/2017 | Wernersbach et al. | |
| 9,646,369 B2 | 5/2017 | Salzman et al. | |
| 9,656,804 B2 * | 5/2017 | Lyon | G06Q 10/0875 |
| 2015/0081090 A1 | 3/2015 | Dong | |
| 2017/0260008 A1 * | 9/2017 | DeWitt | B65G 43/08 |

FOREIGN PATENT DOCUMENTS

| | | |
|---|---|---|
| CN | 103354797 A | 10/2013 |
| CN | 104525488 A | 4/2015 |
| CN | 105057219 A | 11/2015 |
| CN | 204817212 U | 12/2015 |
| CN | 204817213 U | 12/2015 |
| JP | 2000288476 A | 10/2000 |
| WO | 2012123513 A1 | 9/2012 |
| WO | 2016125000 A1 | 8/2016 |
| WO | 2017074028 A1 | 5/2017 |

* cited by examiner

PARCEL SORTING SYSTEM AND METHOD

CROSS-REFERENCE TO RELATED APPLICATIONS

This application claims priority to PCT Patent Application No. PCT/CN2016/090684 filed on Jul. 20, 2016, which claims priority to Chinese Patent Application No. CN201510433995.5 filed on Jul. 22, 2015.

TECHNICAL FIELD

The present invention relates to sorting technology, and specifically to a parcel sorting system and method.

BACKGROUND ART

Parcel sorting means dispensing parcels going to different destinations to different exits through a delivery device, so as to realize unified transport of parcels going to the same destination. After researches, the inventors has found that the current parcel sorting is mainly realized in a sorting line, wherein the total sorting speed is limited by the line running speed, the space for improving the line running speed is limited, and it would make the whole line stop working in a situation where a failure occurs at any point of the sorting line, and the line can start to work only after repairing. Moreover, in the current parcel sorting systems, parcel outlets are all provided at the edges of checking platforms. The increasing number of parcels requires more parcel outlets which are all provided on the edges of the checking platforms. As the area of the checking platforms is limited, while the number of the parcel outlets is increased, the parcels would easily be accumulated and is difficult to transport, which greatly reduces the checking efficiency of the parcels.

DISCLOSURE OF THE INVENTION

In this regard, examples of the present invention are directed to provide a parcel sorting system and method, so as to solve the problem existing in the prior art that the parcel sorting efficiency needs to be increased.

In order to achieve the above-mentioned object, the examples of the present invention utilize the technical solutions as follows:

In a first aspect, an example of the present invention provides a parcel sorting system, which includes a parcel sorting device and a parcel collecting device; the parcel sorting device is provided thereon with a plurality of parcel checking inlets and a plurality of parcel outlets, and the parcel collecting device is located just below the parcel sorting device;

the plurality of parcel outlets on the parcel sorting device are respectively in communication with the parcel collecting device, the plurality of parcel outlets are respectively located at the middle or/and edges of the parcel sorting device, the parcel collecting device is provided thereon with storage devices, with one storage device located at each of positions under the parcel outlets, and an opening diameter of the storage device is greater than a diameter of the parcel outlet.

Combining with the first aspect, an example of the present invention provides a first possible embodiment of the first aspect, wherein each of the parcel checking inlets is provided with one parcel information acquisition device, and the parcel checking inlets are in one-to-one correspondence with the parcel information acquisition devices, the parcel information acquisition device is configured to acquire parcel information of the parcel to be sorted at the parcel checking inlet corresponding to the parcel information acquisition device, and the parcel information contains a destination of the parcel to be sorted.

Combining with the first possible embodiment of the first aspect, an example of the present invention provides a second possible embodiment of the first aspect, wherein the system further includes a control device, the control device is in connection with all the parcel information acquisition devices so as to obtain the parcel information acquired by all the parcel information acquisition devices, to obtain the destinations of the respective parcels to be sorted;

The system further includes a plurality of mobile transport devices, wherein the plurality of mobile transport devices are all in connection with the control device, the control device is pre-provided with parcel outlets respectively corresponding to different destinations, the control device is further configured to control, according to the obtained destinations of the parcels to be sorted, at least one of the mobile transport devices to transport the parcels to be sorted to the parcel outlets corresponding to the destinations of the parcels to be sorted.

Combining with the second possible embodiment of the first aspect, an example of the present invention provides a third possible embodiment of the first aspect, wherein the system further includes a detection device and a transfer device, the detection device is configured to detect whether the storage device is full and to transmit to the control device the obtained information about whether the storage device is full, and the transfer device is configured to transfer the storage device which is full according to an instruction from the control device.

Combining with the third possible embodiment of the first aspect, an example of the present invention provides a fourth possible embodiment of the first aspect, wherein each of the mobile transport devices is configured to load one parcel to be sorted or a plurality of parcels to be sorted that go to the same destination;

destination information is carried in a destination address information code, the destination address information code is provided on the parcel to be sorted, each of the parcel information acquisition devices includes a scanner, and the scanner is configured to scan the information code for obtaining the destination of the parcel to be sorted.

In a second aspect, an example of the present invention provides a parcel sorting method, which is applied to a parcel sorting system, wherein the parcel sorting system includes a parcel sorting device and a parcel collecting device; the parcel sorting device is provided thereon with a plurality of parcel checking inlets and a plurality of parcel outlets, and the parcel collecting device is located just below the parcel sorting device; the plurality of parcel outlets on the parcel sorting device are respectively in communication with the parcel collecting device, the plurality of parcel outlets are respectively located at the middle or/and edges of the parcel sorting device, and the parcel collecting device is provided thereon with storage devices, with one storage device located at each of positions under the parcel outlets, and an opening diameter of the storage device is greater than a diameter of the parcel outlet, and the method includes:

presetting correspondence relationships between the parcel outlets and the parcels to be sorted that go to different destinations;

obtaining the destinations of the parcels to be sorted;

transporting the parcels to be sorted to the parcel outlets corresponding to the destinations of the parcels to be sorted; and delivering, through the parcel outlets, the parcels to be sorted into the storage devices under the parcel outlets.

Combining with the second aspect, an example of the present invention provides a first possible embodiment of the second aspect, wherein each of the parcel checking inlets is provided with one parcel information acquisition device, the parcel checking inlets respectively are in one-to-one correspondence with the parcel information acquisition devices, and obtaining the destinations of the parcels to be sorted includes:

acquiring, by respective parcel information acquisition devices, the parcel information of the parcels to be sorted that enter the parcel checking inlets corresponding to the parcel information acquisition devices, wherein the parcel information contains destinations of the parcels to be sorted.

Combining with the first possible embodiment of the second aspect, an example of the present invention provides a second possible embodiment of the second aspect, wherein the system further includes a control device and a plurality of mobile transport devices, the correspondence relationships between the parcel outlets and the parcels to be sorted that go to different destinations are preset in the control device, and transporting the parcels to be sorted to the parcel outlets corresponding to the destinations of the parcels to be sorted includes:

obtaining, by the control device, the parcel information acquired by all the parcel information acquisition devices to obtain the destinations of the respective parcels to be sorted; and controlling at least one of the mobile transport devices, according to the obtained destinations of the parcels to be sorted to transport the parcels to be sorted to the parcel outlets corresponding to the destinations of the parcels to be sorted.

Combining with the second possible embodiment of the second aspect, an example of the present invention provides a third possible embodiment of the second aspect, wherein the system further includes a detection device and a transfer device, and the method further comprises:

obtaining, by the control device, the information detected by the detection device about whether the storage device is full or not, and when obtaining information indicating that the storage device is full, transmitting to the transfer device an instruction for transferring the storage device which is full.

Combining with the third possible embodiment of the second aspect, an example of the present invention provides a fourth possible embodiment of the second aspect, wherein each of the mobile transport devices is configured to load one parcel to be sorted or a plurality of parcels to be sorted that go to the same destination;

The destination information is carried in a destination address information code, the destination address information code is provided on the parcel to be sorted, each of the parcel information acquisition devices includes a scanner, and the scanner is configured to scan the information code for obtaining the destination of the parcel to be sorted.

The methods and systems provided in the examples of the present invention creatively utilize a "double" structure, with the parcel sorting device and the parcel collecting device being arranged up and down for sorting parcels, wherein the parcel outlets on the parcel sorting device are in communication with the parcel collecting device, and during parcel sorting, the parcels to be sorted can enter the parcel collecting device arranged below just by passing through the parcel outlets, thereby completing the sorting. Such a structural design enables that the parcel outlets can be flexibly arranged at the edges of the parcel sorting device or at middle positions of the edges, rather than only being provided at the edges of the parcel sorting device as those in the prior art, which effectively improves the utilization ratio of the parcel sorting device, avoids parcel accumulation, shortens the transport path for parcel sorting, and increases the parcel sorting efficiency, realizing an ingenious design.

Furthermore, in the methods and systems provided in the examples of the present invention, a plurality of parcel checking inlets are provided, with each of the parcel checking inlets being provided with one parcel information acquisition device, such that the information acquisition and sorting of the parcels to be sorted can be performed simultaneously at the plurality of parcel checking inlets, so as to significantly increase the parcel information acquisition efficiency, thereby improving the parcel sorting efficiency.

Furthermore, in the methods and systems provided in the examples of the present invention, a plurality of mobile transport devices that are independent from each other are employed for performing parcel transporting, where each mobile transport device has a relatively high flexibility of use, for example, according to the number of the parcels to be sorted, a corresponding number of mobile transport devices can be controlled to operate; and the travel route is flexible and variable. Therefore, such a mode of parcel transport has a relatively high efficiency, a relatively strong flexibility and a relatively high cost performance, which meets actual demands better.

Furthermore, in the methods and systems provided in the examples of the present invention, a detection device and a transfer device are provided, and when the detection device detects that a storage device is full of parcels, the control device may control the transfer device to transfer the storage device full of parcels, which avoids parcel accumulation and assures the reliability and intellectuality of sorting.

Furthermore, the methods and systems provided in the examples of the present invention are convenient to carry out, can significantly improve the parcel sorting efficiency, have prominent substantive features and represent notable progresses, and are suitable for large-scale popularization and application.

In order to make the above-mentioned objects, features and advantages of the present invention clearer and easier to understand, in the following contents, preferable examples are particularly enumerated and described in details with reference to the accompanying figures.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Example 1

Figure 1:
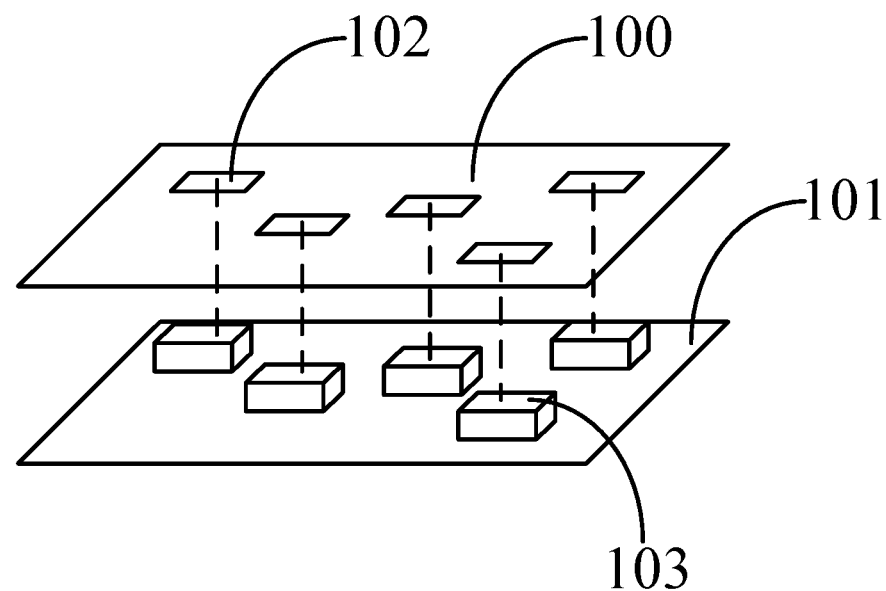
FIG. 1 shows a structural schematic diagram of a sorting system provided in Example 1 of the present invention.

In order to solve the problem existing in the prior art that the parcel sorting efficiency needs to be increased, as shown in FIG. 1, an example of the present invention provides a parcel sorting system. The parcel sorting system includes a parcel sorting device 100 and a parcel collecting device 101; the parcel sorting device 100 is provided thereon with a plurality of parcel checking inlets 104 and a plurality of parcel outlets 102, and the parcel collecting device 101 is located just below the parcel sorting device 100; the plurality of parcel outlets 102 on the parcel sorting device 100 are respectively in communication with the parcel collecting device 101, the plurality of parcel outlets 102 are respectively located at the middle or/and edges of the parcel sorting device 100, and the parcel collecting device 101 is provided thereon with storage devices 103, with one storage device located at each of positions of the parcel outlets, and an opening diameter of the storage device 103 is greater than a diameter of the parcel outlet 102.

The parcel sorting device 100 and the parcel collecting device 101 are embodied in many structures, e.g. quadrangle, circle, polygon and so on, and the parcel collecting device 101 and the parcel sorting device 100 preferably have substantially same area.

In order to improve the parcel sorting efficiency, preferably, each of the parcel checking inlets 104 is provided with one parcel information acquisition device 200, the parcel checking inlets 104 are in one-to-one correspondence with the parcel information acquisition devices 200, the parcel information acquisition devices 200 are configured to acquire parcel information of the parcels to be sorted that enter the parcel checking inlets 104 corresponding to the parcel information acquisition devices 200, and the parcel information contains destinations of the parcels to be sorted.

A plurality of parcel checking inlets 104 are provided, with each parcel checking inlet 104 being provided with a parcel information acquisition device 200, such that the information acquisition and sorting of the plurality of parcels to be sorted may be performed simultaneously at the plurality of parcel checking inlets 104, so as to significantly increase the parcel information acquisition efficiency, thereby improving the parcel sorting efficiency.

In the above, there are many manners for the parcel information acquisition devices 200 to acquire the parcel information of the parcels to be sorted. Preferably, the destination information is carried in a destination address information code, the destination address information code is provided on the parcel to be sorted, each of the parcel information acquisition devices 200 includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices 200 obtain the destinations of the parcels to be sorted by scanning the information codes on the parcels to be sorted, wherein the information code may be a bar code, a two-dimensional code, a radio frequency tag etc., and correspondingly, the parcel information acquisition device 200 may be a bar code scanner, a two-dimensional code scanner, a radio frequency identifier, etc., and the mobile transport device 202 may be an auto-navigating small vehicle.

According to actual demands, in addition to the destination, the parcel information may further contain information about the parcel volume, weight etc., and correspondingly, the parcel information acquisition device 200 may further include a weighing device, a volume scanner, etc.

While the parcel information is highly-efficiently obtained, in order to improve the efficiency of subsequent sorting, preferably, after the plurality of parcel information acquisition devices 200 simultaneously acquire the parcel information of the respective parcels to be sorted, the control device 201 is used to complete the analytical processing of the obtained parcel information of all the parcels to be sorted, thereby obtaining the destination information of the respective parcels to be sorted. For example, the system further includes a control device 201, the control device 201 is in connection with all the parcel information acquisition devices 200 so as to obtain the parcel information acquired by all the parcel information acquisition devices 200, to obtain the destinations of the respective parcels to be sorted.

Figure 2:
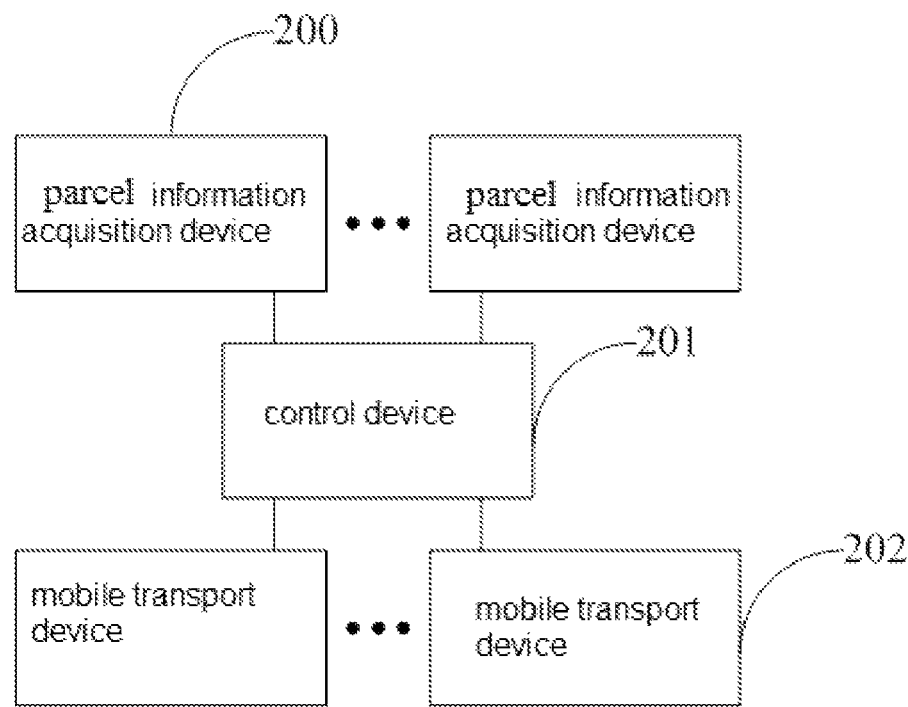
FIG. 2 shows a system chart of the sorting system provided in Example 1 of the present invention.

After obtaining the parcel information, in order to improve the efficiency of the subsequent sorting processes, the system preferably further includes a plurality of mobile transport devices 202, wherein the plurality of mobile transport devices 202 are in connection with the control device 201, the control device 201 is pre-provided with parcel outlets 102 respectively corresponding to different destinations, the control device 201 is further configured to control, according to the obtained destinations of the parcels to be sorted, at least one of the mobile transport devices 202 to transport the parcels to be sorted to the parcel outlets 102 corresponding to the destinations of the parcels to be sorted, as shown in FIG. 2.

In the above, the control device 201 has already obtained the destinations of the respective parcels to be sorted at the respective parcel checking inlets 104, and the parcel sorting can be completed just by obtaining the transport paths of the respective parcels to be sorted through analysis according to the positions of the parcel outlets 102 corresponding to the destinations of the respective parcels to be sorted, and then controlling at least one of the mobile transport devices 202 to transport, according to the transport paths, each of the parcels to be sorted to the parcel outlets 102 corresponding to the destinations of the parcels to be sorted.

The analysis by the control device 201 on the transport paths of the respective parcels to be sorted is performed simultaneously. After the path analysis is completed, the plurality of mobile transport devices 202 may be simultaneously controlled, to simultaneously complete transporting of the individual parcels to be sorted, thereby significantly improving the parcel sorting efficiency.

Each of the mobile transport devices 202 is configured to load one parcel to be sorted or a plurality of parcels to be sorted that go to the same destination. Preferably, the mobile transport device 202 is configured to transport one parcel to be sorted one time, and the control device 201 sends a control instruction to the mobile transport device 202 after obtaining the destination of the parcel to be sorted that is going to be transported by the mobile transport device 202, such that the mobile transport device 202 travels to the position of the parcel outlet 102 corresponding to the destination of the parcel to be sorted.

In the above, the parcels to be sorted may be manually loaded onto the mobile transport devices 202, and the parcels to be sorted may also be automatically loaded onto the mobile transport devices 202 by intelligently controlling parcel gripping devices or the like through the control device 201. Similarly, the transport of the parcels to be sorted from the parcel outlets 102 to the parcel collecting device 101 can be performed manually, and may also be completed by intelligently controlling parcel gripping devices or the like through the control device 201.

Figure 3:
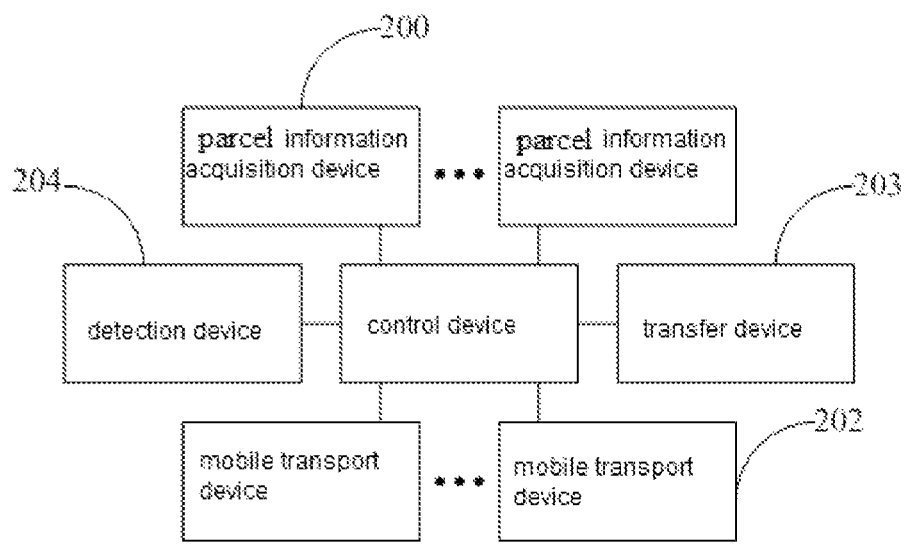
FIG. 3 shows a system chart of another sorting system provided in Example 1 of the present invention.
Figure 4:
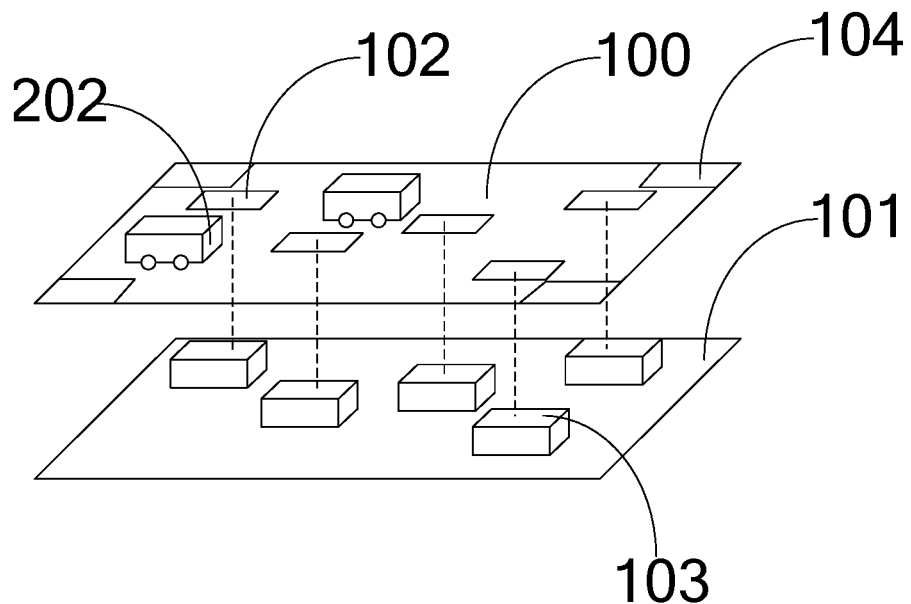
FIG. 4 shows a structural schematic diagram of another sorting system provided in Example 1 of the present invention.

In order to assure that the respective parcels to be sorted that are transported into the parcel collecting device 101 can be delivered in time, the system preferably further includes a detection device 204 and a transfer device 203, wherein the detection device 204 is configured to detect whether a storage device 103 is full or not and to transmit to the control device 201 the obtained information regarding whether the storage device 103 is full or not, and the transfer device 203 is configured to transfer the storage device 103 which is full according to an instruction from the control device 201. There are many options for the transfer device 203, e.g. an intelligent robot; and for another example, the storage device 103 is mounted on the transfer device 203, and the transfer device 203 is a large-scale auto-navigating vehicle and may move to a position and load and unload the parcels according to the control instruction of the control device 201, as shown in FIGS. 3 and 4.

Based on the above-mentioned system architecture, the examples of the present invention are implemented as follows:

the respective mobile transport devices 202 transport the parcels to be sorted to the respective parcel checking inlets 104, and the parcel information acquisition devices 200 at the respective parcel checking inlets 104 acquire the parcel information of the respective parcels and transmit the acquired parcel information to the control device 201, the control device 201 performs simultaneous analysis on the parcel information of the plurality of parcels to be sorted to obtain the destinations of the respective parcels to be sorted and the parcel outlets 102 corresponding to the respective destinations, and controls the plurality of mobile transport devices 202 to simultaneously transport the respective parcels to be sorted to the corresponding parcel outlets 102, the parcels to be sorted are delivered from the parcel outlets 102 into the storage devices 103 on the parcel collecting device 101 located below, and then they are moved away from the parcel outlets 102 according to a control instruction of the control device 201 and waits for further instructions; and the processes above are repeated till all the parcels to be sorted are delivered into the storage devices 103. In the meantime, the detection device 204 constantly detects whether there is a storage device 203 which is full of parcels, and when there is a storage device 103 full of parcels, the control device 201 controls the transfer device 203 to transfer the storage device 103 and placing an empty storage device 103 at the position where the transferred storage device 103 was, till sorting of all the parcels to be sorted is completed.

The parcel sorting system provided in an example of the present invention can make full use of the area of the parcel sorting device 100, increasing a plurality of effective parcel outlets 102 and solving the traditional problem of goods accumulation and thereby greatly increasing checking efficiency, so as to make the whole operation flow of the parcel sorting more systematized and intelligentized; and a "double" structure is creatively adopted, with the parcel sorting device 100 and the parcel collecting device 101 being arranged one above the other for sorting parcels, wherein the parcel outlets 102 on the parcel sorting device 100 are in communication with the parcel collecting device 101, and during parcel sorting, the parcels to be sorted can enter the parcel collecting device 101 arranged below just by passing through the parcel outlets 102, thereby completing the sorting. Such a structural design enables that the parcel outlets 102 can be flexibly arranged on the edges of the parcel sorting device 100 or at middle positions of the edges, rather than only being provided at the edges of the parcel sorting device 100 as those in the prior art, and the middle position in the examples of the present invention refers to positions on the parcel sorting device 100 other than the edges. The utilization ratio of the parcel sorting device 100 is efficiently improved, the transport path for parcel sorting is shortened, the parcel sorting efficiency is increased, and the design is very ingenious.

Example 2

Figure 5:
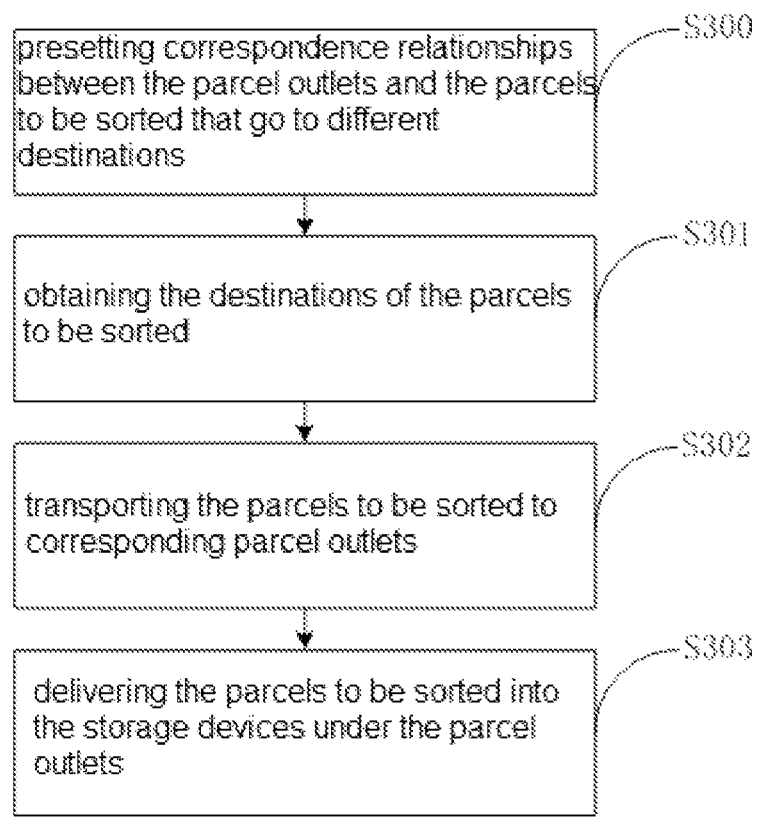
FIG. 5 shows a schematic flow diagram for sorting provided in Example 2 of the present invention.

As shown in FIG. 5, an example of the present invention provides a parcel sorting method, which is applied to a parcel sorting system, wherein the parcel sorting system comprises a parcel sorting device and a parcel collecting device; the parcel sorting device is provided with a plurality of parcel checking inlets and a plurality of parcel outlets, and the parcel collecting device is located just below the parcel sorting device; the plurality of parcel outlets on the parcel sorting device are respectively in communication with the parcel collecting device, the plurality of parcel outlets are respectively located at the middle or/and edges of the parcel sorting device, and the parcel collecting device is respectively provided thereon with storage devices, with one storage device located at each of positions the parcel outlets, and an opening diameter of the storage device is greater than a diameter of the parcel outlet; and the method includes:

step S300: presetting correspondence relationships between the parcel outlets and the parcels to be sorted that go to different destinations; step S301: obtaining the destinations of the parcels to be sorted; step S302: transporting the parcels to be sorted to the parcel outlets corresponding to the destinations of the parcels to be sorted; and step S303: delivering, through the parcel outlets, the parcels to be sorted into the storage devices under the parcel outlets.

In order to improve the parcel sorting efficiency, preferably, each of the parcel checking inlets is provided with one parcel information acquisition device, the parcel checking inlets are in one-to-one correspondence with the parcel information acquisition devices, and obtaining the destinations of the parcels to be sorted includes: acquiring, by the respective parcel information acquisition devices, the parcel information of the parcels to be sorted that enter the parcel checking inlets corresponding to the parcel information acquisition devices, with the parcel information containing the destinations of the parcels to be sorted.

There are many manners for the parcel information acquisition devices to acquire the parcel information on the parcels to be sorted. Preferably, the destination information is carried in a destination address information code, the destination address information code is provided on the parcel to be sorted, each of the parcel information acquisition devices includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices obtain the destinations of the parcels to be sorted by scanning the information codes on the parcels to be sorted, wherein the information code may be a bar code, a QR code, an RF Tag etc., and correspondingly, the parcel information acquisition device may be a bar code scanner, a two-dimensional code scanner, a radio frequency identifier, etc., and the mobile transport device may be an auto-navigating small vehicle.

According to actual demands, in addition to the destination, the parcel information may further contain information about the parcel volume, weight etc., and correspondingly, the parcel information acquisition device may further include a weighing device, a volume scanner, etc.

While the parcel information is highly-efficiently obtained, in order to improve the efficiency of subsequent sorting, preferably, after the plurality of parcel information acquisition devices simultaneously acquire the parcel information of the respective parcels to be sorted, the control device is used to complete the analytical processing of the obtained parcel information of all the parcels to be sorted, thereby obtaining the destination information of the respective parcels to be sorted. For example, the system further includes a control device and a plurality of mobile transport devices, wherein the correspondence relationships between the parcel outlets and the parcels to be sorted that go to different destinations are preset in the control device, and transporting the parcels to be sorted to the parcel outlets corresponding to the destinations of the parcels to be sorted includes: obtaining, by the control device, the parcel information acquired by all the parcel information acquisition devices to obtain the destinations of the respective parcels to be sorted; and controlling at least one of the mobile transport devices, according to the obtained destinations of the parcels to be sorted, to transport the parcels to be sorted to the parcel outlets corresponding to the destinations of the parcels to be sorted.

After obtaining the parcel information, in order to improve the efficiency of the subsequent sorting processes, the system preferably further includes a detection device and a transfer device, and the method further includes: obtaining, by the control device, the information detected by the detection device about whether the storage device is full or not, and when obtaining information indicating that the storage device is full, transmitting to the transfer device an instruction for transferring the storage device which is full.

In the above, the control device has already obtained the destinations of the respective parcels to be sorted at the respective parcel checking inlets, and the parcel sorting can be completed just by obtaining the transport paths of the respective parcels to be sorted through analysis according to the positions of the parcel outlets corresponding to the destinations of the respective parcels to be sorted, and then controlling at least one of the mobile transport devices to transport, according to the transport paths, each of the parcels to be sorted to the parcel outlets corresponding to the destinations of the parcels to be sorted.

The analysis by the control device on the transport paths of the respective parcels to be sorted is performed simultaneously. After completing the path analysis, the plurality of mobile transport devices may be simultaneously controlled to simultaneously complete transporting of the respective parcels to be sorted, thereby significantly improving the parcel sorting efficiency.

Each of the mobile transport devices is configured to load one parcel to be sorted or a plurality of parcels to be sorted that go to the same destination. Preferably, the mobile transport device is configured to transport one parcel to be sorted one time, and the control device sends a control instruction to the mobile transport device after obtaining the destination of the parcel to be sorted that is going to be transported by the mobile transport device, such that the mobile transport device travels to the position of the parcel outlet corresponding to the destination of the parcel to be sorted.

In the above, the parcels to be sorted may be manually loaded onto the mobile transport device, and the parcels to be sorted may also be automatically loaded onto the mobile transport devices by intelligently controlling parcel gripping devices or the like through the control device. Similarly, the transport of the parcels to be sorted from the parcel outlets to the parcel collecting device can be performed manually, and may also be completed by intelligently controlling parcel gripping devices or the like through the control device.

As to the methods provided in the examples of the present invention, the implementation principles and the technical effects produced thereof are the same as those in the preceding examples regarding the systems, and for brief description, as for contents not mentioned in the examples regarding the methods, reference can be made to the corresponding contents in the preceding examples regarding the systems.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The invention claimed is:
1. A system comprising:
  a parcel supply location, the parcel supply location including a plurality of parcels, each parcel having an identifier that includes information related to a destination for shipping through a parcel shipping service;
  a computer controlled transport vehicle having a first position in which a selected parcel is stowed about the transport vehicle and a second position in which the selected parcel is deposited into a respective destination container of a plurality of destination containers;
  an information acquisition device configured to interact with an identifier associated with a selected parcel, wherein the information acquisition device is fixedly positioned relative to the parcel supply location;
  a controller configured to:

determine one destination container to deposit, with the computer controlled transport vehicle, the selected parcel based on the interaction with the identifier and a determined destination for shipping;

direct the computer controlled transport vehicle by communicating with a computing device of the computer controlled transport vehicle to transport the selected parcel to the one destination container and deposit the parcel by manipulation of the computer controlled transport vehicle from the first position to the second position for receipt of the selected parcel in the one destination container.

2. The system of claim 1, wherein the information acquisition device is configured to image the selected parcel.

3. The system of claim 1, wherein the controller is configured to direct the computer controlled transport vehicle to return proximal the parcel supply location, wherein the computer controlled transport vehicle is in the first position upon returning proximal the parcel supply location, wherein the first position is a position in which the selected parcel is stowed and the second position is a position in which an orientation of the computer controlled transport vehicle changes to deposit the selected parcel into a destination container.

4. The system of claim 1, further including a first platform elevated from a second platform, wherein the computer controlled transport vehicle traverses the first platform and the selected parcel is deposited into the one destination container, wherein the one destination container is about the second platform.

5. The system of claim 4, wherein each destination container of the destination containers is positioned proximal a recess in the first platform.

6. The system of claim 4, wherein the system further includes a detection device that monitors a respective destination container to determine whether the respective destination container is at or near capacity, and the controller is further configured to direct a transfer vehicle to remove the at or near capacity destination container in response to receiving an indication that the destination container is at or near capacity.

7. The system of claim 6, wherein the transfer vehicle traverses the second platform and the computer controlled transport vehicle traverses the first platform.

8. The system of claim 1, further including a plurality of computer controlled transport vehicles.

9. The system of claim 8, wherein each computer controlled transport vehicle carries a respective single selected parcel at a time.

10. The system of claim 1, wherein the controller is configured to direct a plurality of computer controlled transport vehicles, wherein the controller is further configured to direct the plurality of computer controlled transport vehicles such that the computer controlled transport vehicles do not collide with one another by altering a direction of travel of respective computer controlled transport vehicles in order to avoid an expected collision.

11. A controller configured for use with material handling, the controller comprising a memory and a processor, the controller configured to:

receive or acquire information from an interaction with identifier associated with a selected parcel from a plurality of parcels at a parcel supply location, each parcel having an identifier that includes a postal address destination for shipping through a parcel shipping service;

wherein the received or acquired information is from an information acquisition device that is fixedly positioned relative to the plurality of parcels;

determine one destination container of a plurality of destination containers to deposit, with a computer controlled transport vehicle, the selected parcel based on the interaction with the identifier and a determined destination for shipping;

direct the computer controlled transport vehicle by communicating with a computing device thereof to transport the selected parcel to the destination container and deposit the selected parcel by manipulation of the computer controlled transport vehicle from a first position in which the selected parcel is stowed about the computer controlled transport vehicle to a second position in which the selected parcel is deposited into the one destination container for receipt thereof.

12. A transport vehicle configured for transporting a parcel of a plurality of parcels, the transport vehicle having a memory and a processor, the transport vehicle configured to:

receive or acquire information from a controller, wherein the controller interacts with an identifier associated with a selected parcel from the plurality of parcels, each parcel having an identifier that includes a postal address destination for shipping through a parcel shipping service, wherein the received or acquired information is from an interaction with an information acquisition device that is fixedly positioned relative to the plurality of the parcels;

receive directions to traverse to a destination container of a plurality of destination containers to deposit, with the transport vehicle, the selected parcel based on the interaction with the identifier; and deposit the selected parcel by manipulation of the transport vehicle from a first position in which the selected parcel is stowed about the transport vehicle to a second position in which the selected parcel is deposited into the destination container for receipt of the selected parcel therein.

13. A system comprising:

a parcel supply location including a plurality of parcels, each parcel having an identifier that includes a postal address destination for shipping through a parcel shipping service;

a first platform elevated from a second platform, the first platform defining a plurality of openings for depositing a selected parcel into a destination container positioned about the second platform, wherein the first platform does not move relative to the second platform;

a computer controlled transport vehicle having a first position in which the selected parcel is stowed about the transport vehicle and a second position in which the selected parcel is deposited by manipulation of the computer controlled transport vehicle, wherein the computer controlled transport vehicle is self-powered and traverses the first platform, wherein the first position is a position in which the selected parcel is stowed and the second position is a position in which a shape of the computer controlled transport vehicle changes to deposit the selected parcel into a destination container;

an information acquisition device configured to interact with an identifier associated with the selected parcel, wherein the information acquisition device is fixedly positioned relative to the parcel supply location;

a controller configured to:

determine one destination container to deposit, with the computer controlled transport vehicle, the selected parcel based on the interaction with the identifier and a determined destination for shipping;

direct the computer controlled transport vehicle by communicating with the computer controlled transport vehicle to transport the selected parcel to the opening associated with the determined one destination container and deposit the selected parcel by manipulation of the computer controlled transport vehicle from the first position to the second position for receipt of the selected parcel in the one determined destination container;

monitor a respective destination container to determine whether a container is at or near capacity; and direct a transfer vehicle to remove the at or near capacity destination container in response to receiving an indication that the destination container is at or near capacity, wherein the transfer vehicle traverses the second platform.

14. The system of claim 13, wherein the information acquisition device is configured to image the selected parcel.

15. The system of claim 13, wherein the controller is configured to direct the computer controlled transport vehicle to return proximal the parcel supply, wherein the computer controlled transport vehicle is in the first position upon returning proximal the parcel supply location.

16. The system of claim 13, further including a plurality of computer controlled transport vehicles.

17. The system of claim 16, wherein each computer controlled transport vehicle carries a respective single selected parcel.

18. The system of claim 13, wherein the controller is configured to direct a plurality of computer controlled transport vehicles, wherein the controller is further configured to direct the plurality of computer controlled transport vehicles such that the computer controlled transport vehicles do not collide with one another.

* * * * *